(12) United States Patent
Isobe

(10) Patent No.: US 8,773,677 B2
(45) Date of Patent: Jul. 8, 2014

(54) INFORMATION PROCESSING APPARATUS, PDL DATA CONVERSION METHOD, AND STORAGE MEDIUM

(75) Inventor: Naohiro Isobe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 13/434,059

(22) Filed: Mar. 29, 2012

(65) Prior Publication Data

US 2012/0268763 A1    Oct. 25, 2012

(30) Foreign Application Priority Data

Apr. 19, 2011   (JP) ................................. 2011-092684

(51) Int. Cl.
G06F 3/12       (2006.01)

(52) U.S. Cl.
USPC ......... 358/1.13; 358/1.15; 358/1.16; 358/1.9; 358/1.18; 715/276; 715/243; 715/249; 715/235; 715/204

(58) Field of Classification Search
USPC ............... 358/1.13, 1.15, 1.16, 1.9, 1.18; 715/276, 243, 249, 235, 204
See application file for complete search history.

(56) References Cited

U.S. PATENT DOCUMENTS

| 2005/0125724 | A1* | 6/2005 | Peiro et al. .................... 715/517 |
| 2008/0259387 | A1 | 10/2008 | Hirai |
| 2011/0170140 | A1* | 7/2011 | Naka et al. .................... 358/1.16 |
| 2011/0181913 | A1* | 7/2011 | Yoshimura et al. .......... 358/1.15 |

FOREIGN PATENT DOCUMENTS

| JP | 2004-289357 A | 10/2004 |
| JP | 2010-109420 A | 5/2010 |

* cited by examiner

*Primary Examiner* — Jacky X Zheng

(74) *Attorney, Agent, or Firm* — Carter, DeLuca, Farrell & Schmidt, LLP

(57) ABSTRACT

An information processing apparatus that converts PDL data into PDL data having a hierarchical structure is provided. The information processing apparatus: acquires the number of records in PDL data and creates a template including nodes in a record layer, which correspond to records in a one-to-one relationship and are equal to the number of records, based on the number of records; inputs PDL data and acquires relational information indicating the relation between a page and a record both included in PDL data; adds nodes in a lower layer of the record layer, which are linked with the nodes in the record layer included in the created template, and sets attribute information about PDL data to each of the nodes in the lower layer of the record layer; and maps each page included in PDL data to each node in the lower layer of the record layer based on relational information.

15 Claims, 13 Drawing Sheets

FIG. 10

```
Pdf2pdfvt
 -record_num 3
 -input_pdf Front cover. pdf  Chapter 1. pdf  Chapter 2. pdf
 -input_print_setting Front cover setting.jdf  Chapter 1 setting.jdf  Chapter 2 setting.jdf
 -page_num_equal_a
```

INFORMATION PROCESSING APPARATUS, PDL DATA CONVERSION METHOD, AND STORAGE MEDIUM

BACKGROUND OF THE INVENTION

1. Field of the Invention

The present invention relates to an information processing apparatus, a PDL data conversion method, and a storage medium.

2. Description of the Related Art

In recent years, the Print On Demand (hereinafter abbreviated as "POD") market has been expanding along with an increase in print speed and image quality of electrophotographic and inkjet digital printers. In general, POD is a service for printing electronic data with use of a digital printer, and POD enables performing relatively small-lot print jobs in a shorter turnaround time than when conventional offset printing or the like is used.

With POD, a printing method known as variable data printing (hereinafter abbreviated as "VDP") is performed, which takes advantage of the characteristic that electronic data is used. A collection of logical information such as page layout, data source, or the like required for one VDP is referred to as a "VDP document". A VDP document is divided into a fixed portion and a variable portion. An information processing apparatus that performs print processing for a VDP document acquires data for the variable portion from a data source such as an RDB (Relational Database) or a CSV (Comma Separated Values) file. The information processing apparatus associates a column (field) in the data source with a variable portion in a template document, and applies data in that column of the data source row-by-row (record-by-record), thus enabling printing slightly different content each time.

The application of VDP enables creating, for example, direct mail in which product information to be provided changes in accordance with customer information. Printing by changing product information to be provided in accordance with customer information is performed so that a higher advertising effect than normal printing can be provided.

Here, the physical electronic data of a VDP document is referred to as "VDP data". The application or the system for creating VDP data is referred to as a "VDP data producer". The application or the system for performing interpretation processing for VDP data and outputting VDP data using a digital printing machine is referred to as a "VDP data consumer".

As VDP data, electronic data described in arbitrary page description language (hereinafter abbreviated as "PDL") may be employed. However, VDP data described in PDL exclusively for VDP (hereinafter referred to as a "VDP language") is advantageous in terms of processing efficiency. This is because the VDP language enables the description such that an object of the fixed portion of a VDP document (hereinafter referred to as a "fixed object") is defined in advance so as to refer to the fixed object later. When the VDP language is subjected to print processing using a VDP data processing system, the VDP data processing system holds the result of interpretation processing for each fixed object, and copies the result of interpretation processing each time the fixed object is referred to. This increases the speed of processing for the entire VDP data.

Among the VDP languages, a PPML (Personalized Print Markup Language) can express the structure of a document using a hierarchical structure. The structure of a document indicates a semantic unit of pages in a document. For example, the structure of a document has a semantic unit such as one record in VDP, the front cover and the text therein, the chapter configuration in the text, or the like.

The expression of the structure of a document by means of PDL is effective for a user of an information processing apparatus for performing image formation processing to make print settings. In general, JDF (Job Definition Format) is often used for making print settings.

Here, assume the case where a user controls printing using PDL by which the structure of a document cannot be expressed. When JDF is used for making print settings, a user makes print settings for each page or a group of pages. For example, when a user wishes to make print settings for "chapter 2" in a document consisting of a plurality of chapters, the user must make print settings for "chapter 2" with knowledge of pages in "chapter 2".

On the other hand, assume the case where a user controls printing using PDL by which the structure of a document can be expressed. When JDF is used for making print settings, a user can make print settings for a semantic unit by the utilization of the structure of a document. For example, a user can make print settings for a document consisting of a plurality of chapters, such as print settings for printing only pages to which a meaning of "chapter 2" has been given, print settings for using a high quality paper sheet for only a page to which a meaning of "front cover" has been given and using plain papers for other pages.

Even when reprinting is performed according to another print setting, creation of a new JDF using a print setting method using JDF is not troublesome. In other words, in the print setting method using JDF, a user who makes print settings does not need to examine that which page belongs to which chapter one-by-one, which is very convenient for a user who makes print settings. Specifically, print settings can be made using PDL by which the structure of a document can be expressed at a higher concept than making print settings using PDL by which the structure of a document cannot be expressed, which is convenient for a user.

In the work flow of POD, PDF (Portable Document Format) is generally used as print data. Thus, PDF is also often used for VDP. Also, there is a format called "PDF/X" that facilitates data exchange and printing by imposing various limitations to PDF. PDF/X is also widely used as print data. However, since PDF and PDF/X are not VDP languages, it was impossible to perform high-speed print processing and make print settings using a higher concept.

Accordingly, International Organization for Standard (hereinafter abbreviated as "ISO") developed PDF/VT, which is PDL to which the function of VDP has been added based on PDF/X, in 2010.

In PDF/VT, the processing performed by a print processing system can be made more efficient by referring to the definition of a rendering object in a document plural times. PDF/VT has a page object structuring function and a metadata setting function. The page object structuring function is realized by a DPart (Document Part) hierarchical structure and the metadata setting function is realized by DPM (DPart Metadata). A group of any key and value can be set in DPM. A meaning can be given to DPart by setting a group of a key and a value in DPM. As a result of which, a user can make print settings for DPart instead of each page under the condition of metadata set in DPM.

For print data or a paper document, the prior art for giving a meaning to a document using the existing PDF function has been proposed. Japanese Patent Laid-Open No. 2004-289357 discloses a method for setting additional information to be added to each component such as images, graphics, text, and the like constituting print data upon conversion of print data into PDF. Also, Japanese Patent Laid-Open No. 2010-109420 discloses an image forming apparatus that sets a chapter divding mark to the read original document image as wished by a user, and stores the electronic document of the original document added with link information at the chapter diving mark thereof. Japanese Patent Laid-Open No. 2008-269261 discloses an information processing apparatus that analyzes a print job created on the basis of a plurality of records to thereby detect the boundary of the records.

For print data or a paper document, the prior art for giving a meaning to a document using the existing PDF function only marks a certain position in a document or gives a meaning to an object using the existing PDF function such as "book mark", "annotation", or the like. The PDF function "book mark" does not indicate a range of pages in a PDF document but indicates an arbitrary position in a PDF document. Also, the PDF function "annotation" is to mainly add a comment or the like to text, and is not intended to structure pages. In other words, the prior art cannot structure pages, and thus, a user cannot make print settings using information to which a meaning has been given by the prior art.

In order to make print settings more flexibly while using a print work flow by means of the already-widely used PDF or PDF/X, using PDF/VT as print data is the most effective solving means. However, flexible print settings cannot be made for data of which the format has already been set to PDF.

In the actual POD work site, in order to save the need for the operation of a print operator, PDF data in which only pages having the same print settings has been collected from the entire print jobs and print setting data are created for each print setting so as to perform separate printing. However, in such a print work flow, it is difficult to perform on-line finishing or the like. Accordingly, it is desired that a PDF data group or a PDF/X data group representing one print job be converted into one PDF/VT. In PDF/VT obtained by the conversion, the page structure of a PDF data group or a PDF/X data group to be input must be properly expressed by the DPart hierarchical structure of PDF/VT to be output.

Conventionally, there has not been proposed an information processing apparatus that converts PDL data such as a PDF data group or the like into PDL data having a hierarchical structure such as PDF/VT or the like such that the page structure of the input PDL data is properly expressed by the hierarchical structure of the output PDL data.

SUMMARY OF THE INVENTION

The information processing apparatus of the present invention is an apparatus that converts PDL data into PDL data having a hierarchical structure such that the page structure of the input PDL data is properly expressed by the hierarchical structure of the output PDL data.

The information processing apparatus of an aspect of the present invention includes a reception unit configured to receive a designation of the number of records from a user, and a creation unit configured to create a structure including nodes in a record layer, which correspond to records in a one-to-one relationship and are equal to the number of records, add nodes in a lower layer of the record layer, which are linked with the nodes in the record layer, to the structure, and map each page included in first PDL data to each node in the lower layer of the record layer based on the relation between records and pages included in first PDL data to thereby create second PDL data which is different from the first PDL data and has a hierarchical structure with respect to pages.

Further features of the present invention will become apparent from the following description of exemplary embodiments with reference to the attached drawings.

BRIEF DESCRIPTION OF THE DRAWINGS

FIG. 10 is a diagram illustrating an example of CUI for use in conversion processing from a PDF file group into PDF/VT.

DESCRIPTION OF THE EMBODIMENTS

Figure 1A:
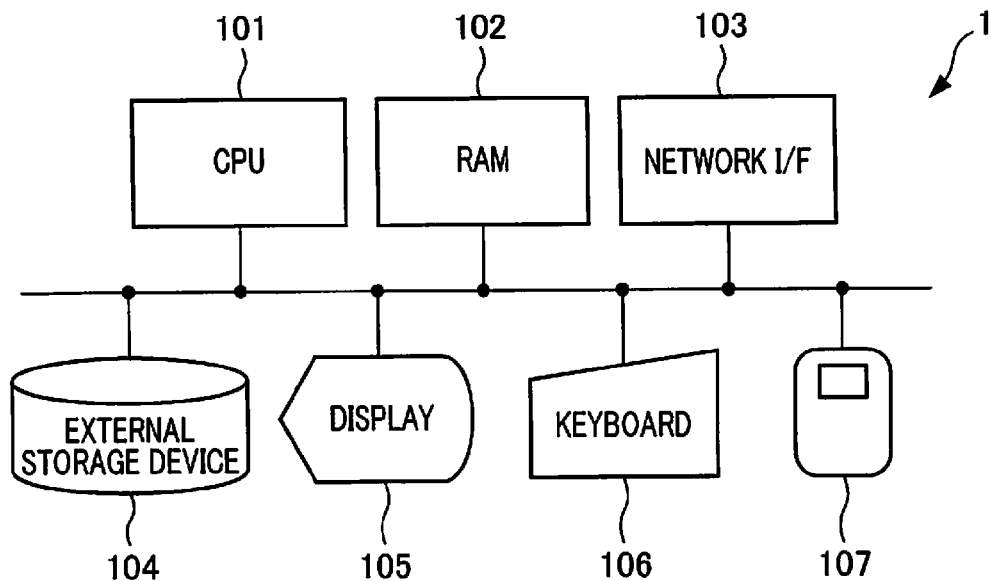
FIG. 1A is a diagram illustrating the hardware configuration of an information processing apparatus.
Figure 1B:
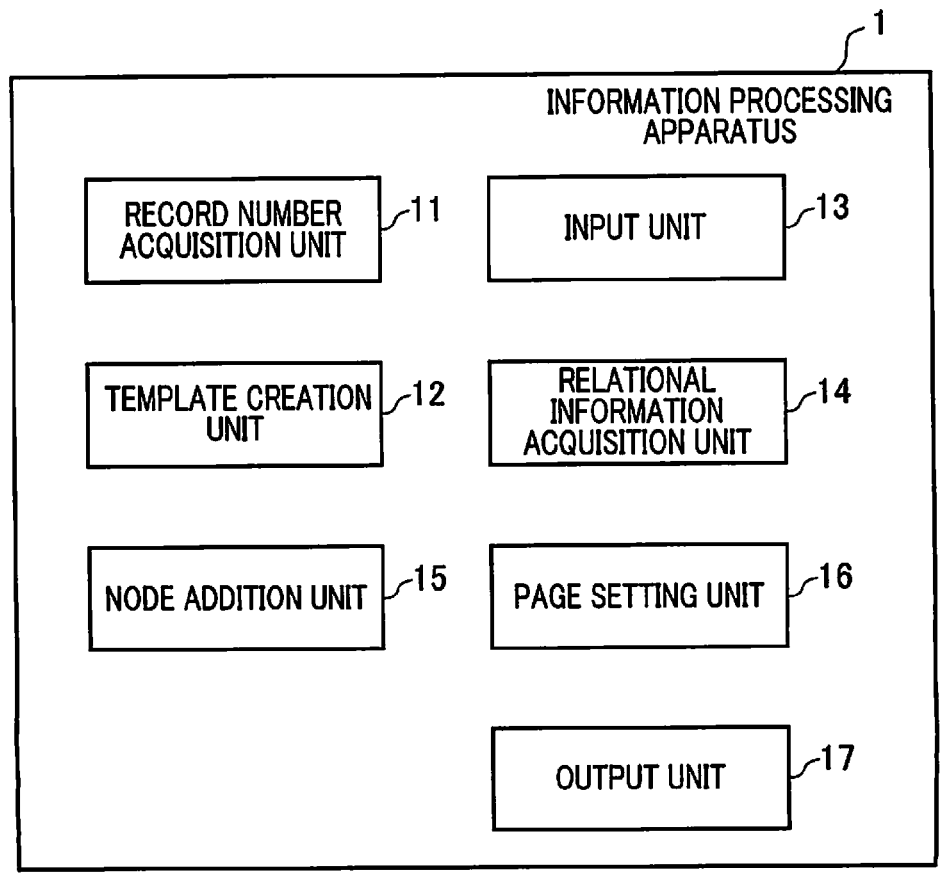
FIG. 1B is an exemplary functional block diagram illustrating the information processing apparatus.

FIGS. 1A and 1B are diagrams illustrating an example of the configuration of the information processing apparatus of the present embodiment. FIG. 1A shows the hardware configuration of an information processing apparatus 1. The information processing apparatus 1 is a processing apparatus that converts PDL data into PDL data having a hierarchical structure. More specifically, the information processing apparatus 1 converts a plurality of PDF data representing VDP data into PDF/VT data having an appropriate DPart hierarchical structure.

PDF/VT is based on PDF/X. Thus, in order to convert PDF data into PDF/VT data, PDF data is required to be temporarily converted into PDF/X data. However, the conversion of PDF data into PDF/X data can be carried out by a known technique. Thus, in the following description of the present embodiment, unless otherwise specified, it is assumed that PDF data as input data has already been converted into PDF/X data.

The information processing apparatus 1 includes a CPU 101, a RAM 102, a network I/F (Interface) 103, an external storage device 104, a display 105, a keyboard 106, and a pointing device 107, where CPU is an abbreviation for Central Processing Unit and RAM is an abbreviation for Random Access Memory.

The CPU 101 controls the overall information processing apparatus in accordance with the control program stored in the RAM 102. The RAM 102 stores a program to be executed by the CPU 101 and data such as a document image or the like. The network I/F 103 is connected to a network. The information processing apparatus 1 transmits/receives data to/from an external device via the network I/F 103 and the network. The external storage device 104 stores the processing result obtained by the information processing apparatus 1 or input information to be input to the information processing apparatus 1. The display 105 displays the processing result obtained by the information processing apparatus 1 or input information to be input to the information processing apparatus 1. The keyboard 106 and the pointing device 107 input information according to a user's operation to the information processing apparatus 1.

A control program stored in the RAM 102 performs the following operations. The control program uses the function of the OS (Operating System) stored in the RAM 102 as required. The control program reads/writes the content of internal data temporarily stored in the RAM 102. The control program transmits/receives data via the network I/F 103. The control program reads/writes data on the external storage device 104. The control program displays visual information such as a user interface, the processing result, or the like on the display 105. Also, the control program receives the input by a user from the keyboard 106 or the pointing device 107. Hereinafter, for describing the operation of the information processing apparatus 1 of the present embodiment, the description of the operation of each individual device provided in the information processing apparatus 1 will be omitted as required.

FIG. 1B is an exemplary functional block diagram illustrating the information processing apparatus 1. The information processing apparatus 1 includes a record number acquisition unit 11, a template creation unit 12, an input unit 13, a relational information acquisition unit 14, a node addition unit 15, a page setting unit 16, and an output unit 17. The PDL data conversion method and the computer program of the present embodiment are realized by the functions of the processing units provided in the information processing apparatus 1 shown in FIG. 1B.

The record number acquisition unit 11 acquires the number of records in PDL data input to the information processing apparatus 1. The record number acquisition unit 11 acquires, for example, the number of records in PDF data (file) in accordance with a user's operation made on the input data record number setting screen shown in FIG. 5A. More specifically, the record number acquisition unit 11 functions as a reception unit configured to receive a designation of the number of records from a user.

The template creation unit 12 creates a template (for example, PDF/VT template). The template creation unit 12 creates a template including nodes, which are equal to the number of records, of a second layer in the hierarchical structure of PDL data (for example, PDF/VT data) after conversion, equal to the number of records, based on the number of records acquired by the record number acquisition unit 11. The second layer is a record layer. The nodes in the record layer correspond to records in a one-to-one relationship.

The input unit 13 input PDL data. The input unit 13 may input the print setting file of the input PDL data. The input unit 13 inputs PDF data and a print setting file in accordance with, for example, a user's operation made on the PDF file input setting screen shown in FIG. 5B.

The relational information acquisition unit 14 acquires relational information indicating the relation between pages and records both included in the input PDL data. The relational information acquisition unit 14 acquires relational information in accordance with, for example, a user's operation made on the PDF file input setting screen shown in FIG. 5B.

The node addition unit 15 adds nodes in a lower layer, which are linked with the nodes in the second layer (nodes in the record layer) included in the created template. The third layer is the lower layer of the record layer. The node addition unit 15 functions as an attribute information setting unit configured to set attribute information about the input PDL data to each of the added nodes in the lower layer of the record layer.

The page setting unit 16 maps each page included in the input PDL data to each node in the third layer based on relational information. When the input unit 13 inputs a print setting file, the page setting unit 16 maps print settings indicated by the input print setting file as the print settings for each page set to a node in the third layer. PDL data having a hierarchical structure is created by the processing executed by the page setting unit 16. The output unit 17 outputs PDL data having a hierarchical structure, which has been created by the page setting unit 16. Also, the output unit 17 outputs the print setting contents set by the page setting unit 16.

More specifically, the template creation unit 12, the relational information acquisition unit 14, the node addition unit 15, and the page setting unit 16 collectively function as a creation unit configured to execute the following processing. The creation unit creates a structure including nodes in a record layer, which correspond to records in a one-to-one relationship and are equal to the number of records. Also, the creation unit adds nodes in a lower layer of the record layer, which are linked with the nodes in the record layer, to the structure. Further, the creation unit maps each page included in first PDL data to each node in the lower layer of the record layer based on the relation between records and pages included in first PDL data to thereby create second PDL data which is different from the first PDL data and has a hierarchical structure with respect to the pages.

Figure 2:
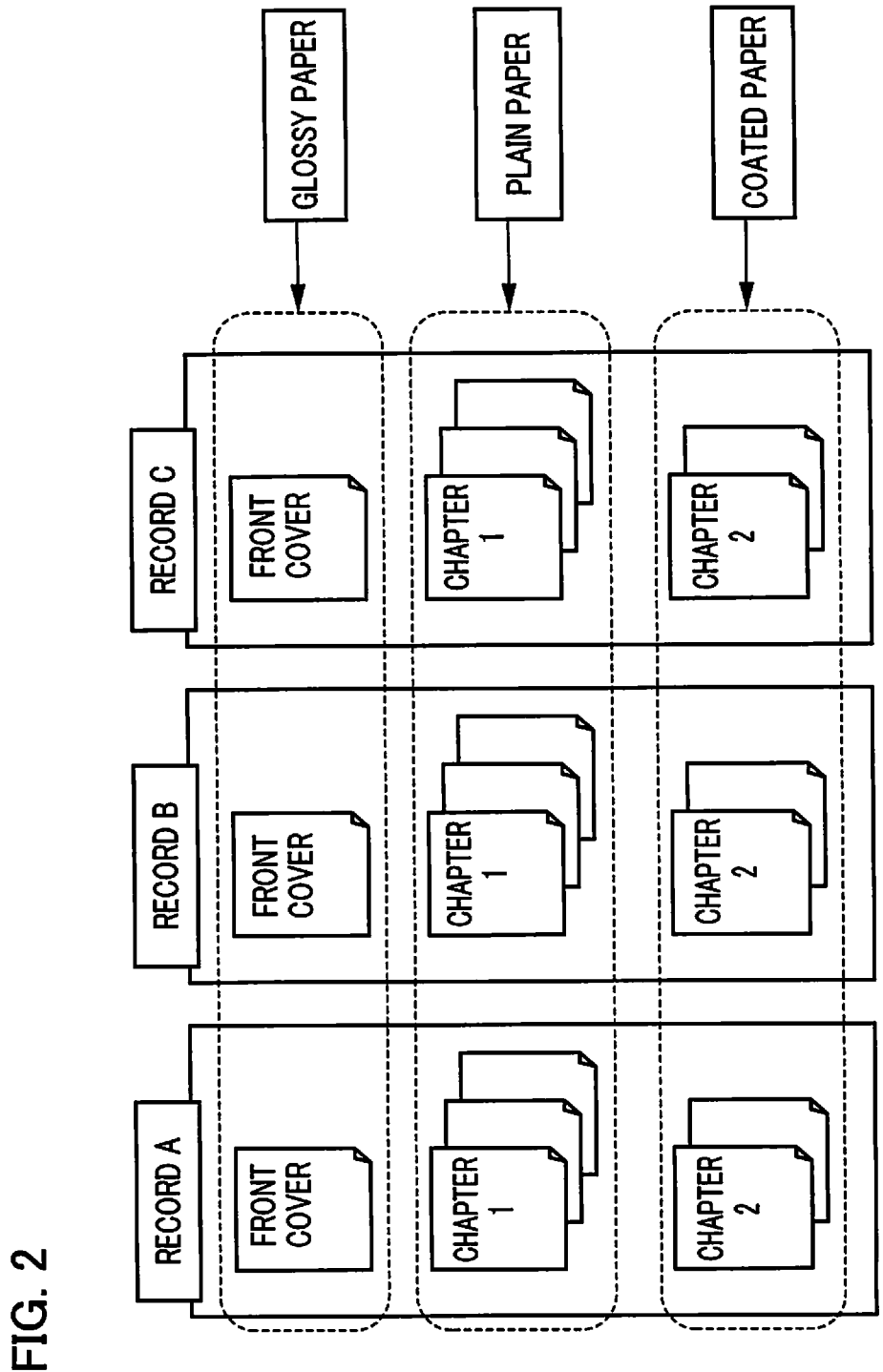
FIG. 2 is a diagram illustrating VDP data to be applied to the information processing apparatus.

FIG. 2 is a diagram illustrating VDP data to be applied to the information processing apparatus. VDP data shown in FIG. 2 has a document configuration having one page for the front cover, three pages for chapter 1, and two pages for chapter 2. In the example shown in FIG. 2, VDP data includes three records (records A, B, and C).

Each record has different printing contents. Also, print settings are made such that glossy paper is used for the front cover, plain paper is used for chapter 1, and coated paper is used for chapter 2.

Figure 3A:
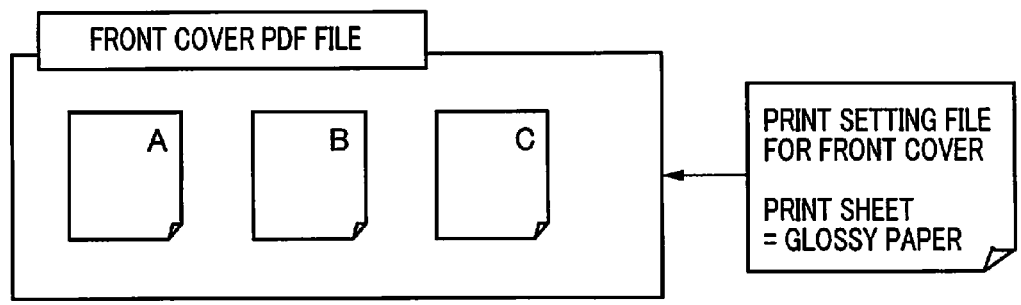
FIGS. 3A to 3C are diagrams illustrating an exemplary PDF file group to be created upon printing VDP data.
Figure 3B:
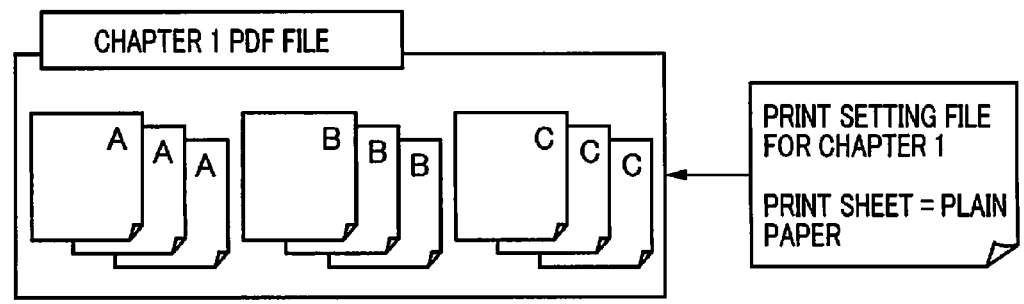
Figure 3C:
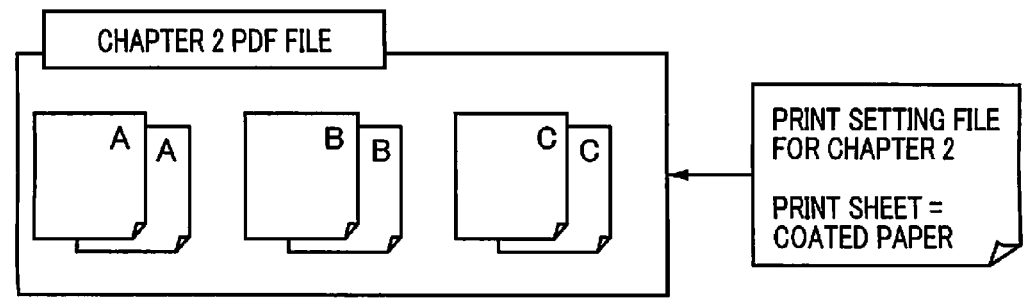

FIGS. 3A to 3C are diagrams illustrating an exemplary PDF file group to be created upon printing VDP data shown in FIG. 2. A PDF file for printing includes a front cover PDF file shown in FIG. 3A, a chapter 1 PDF file shown in FIG. 3B, and a chapter 2 PDF file shown in FIG. 3C. The front cover PDF file only includes a front cover of each of the records A, B, and C. The chapter 1 PDF file only includes pages in chapter 1 of each of the records A, B, and C. The chapter 2 PDF file only includes pages in chapter 2 of each of the records A, B, and C.

The number of pages included in the front cover PDF file is three in total because each record has one page. The front cover PDF file is associated with print settings indicated by a print setting file for front cover. In the print settings indicated by the print setting file for front cover, print paper is specified as glossy paper.

The number of pages included in the chapter 1 PDF file is nine in total because each record has three pages. The chapter 1 PDF file is associated with print settings indicated by a print setting file for chapter 1. In the print settings indicated by the print setting file for chapter 1, print paper is specified as plain paper. The number of pages included in the chapter 2 PDF file is six in total because each record has two pages. The chapter 2 PDF file is associated with print settings indicated by a print setting file for chapter 2. In the print settings indicated by the print setting file for chapter 2, print paper is specified as coated paper. When a PDF file group described with reference to FIG. 3 is already present, the information processing apparatus 1 converts the input PDF file group into PDF/VT.

Figure 4:
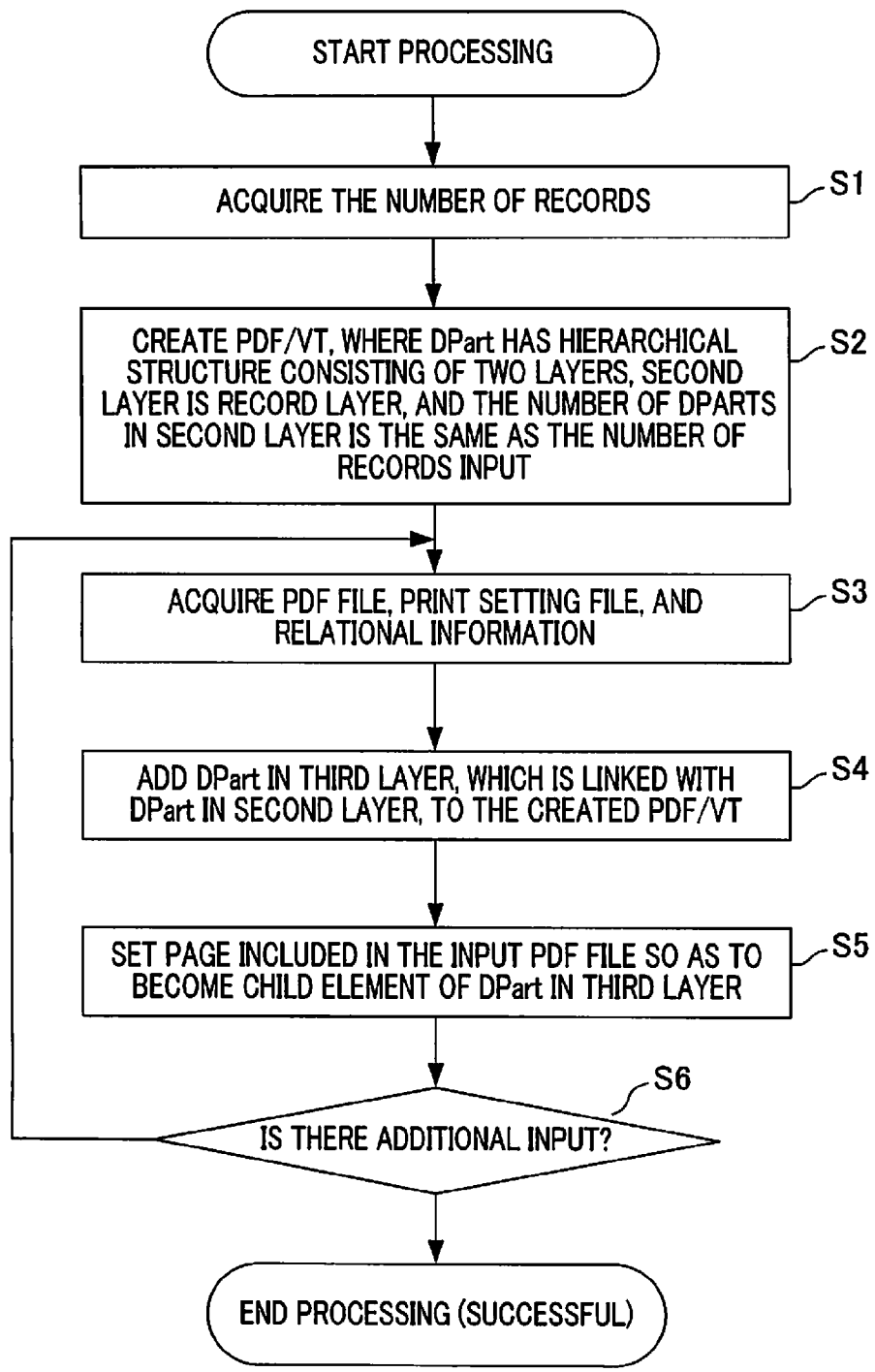
FIG. 4 is a flowchart illustrating an example of PDL data conversion processing.

FIG. 4 is a flowchart illustrating an example of PDL data conversion processing performed by an information processing apparatus. In this example, the information processing apparatus 1 converts a PDF file group into PDF/VT. Firstly, the record number acquisition unit 11 acquires the number of records in PDF data to be input to the information processing apparatus 1 in accordance with a user's operation made on the input data record number setting screen shown in FIG. 5A (step S1).

Figure 5A:
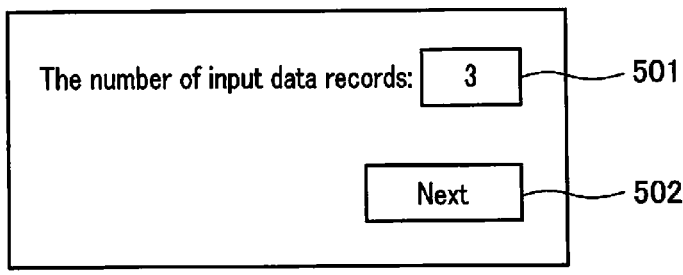
FIG. 5A shows an exemplary input data record number setting screen.

FIG. 5A shows an exemplary input data record number setting screen. The input data record number setting screen is a screen for setting the number of records in data. The input data record number setting screen is an exemplary user interface displayed by the information processing apparatus 1. For example, when the PDF file group shown in FIG. 3 is input data, the number of records is three. When a user inputs "3" to a setting field 501 on the input data record number setting screen and presses down a "next" button 502, the record number acquisition unit 11 acquires three as the number of records.

Next, the template creation unit 12 creates a PDF/VT template (step S2). A PDF/VT template to be created has a DPart hierarchical structure consisting of two layers.

In the template, the second layer is a record layer. DPart is a node included in the second layer. The number of DParts in the second layer is the same as the number of records acquired in step S1. In this example, the number of records acquired in step S1 is three, and thus, the number of DParts in the second layer is three. In step S2, the template creation unit 12 also creates a print setting template to be associated with PDF/VT.

The created print setting template is a template for adding print setting in the subsequent step and has no setting information upon creation thereof. In this example, JDF is employed as a print setting template.

Figure 6A:
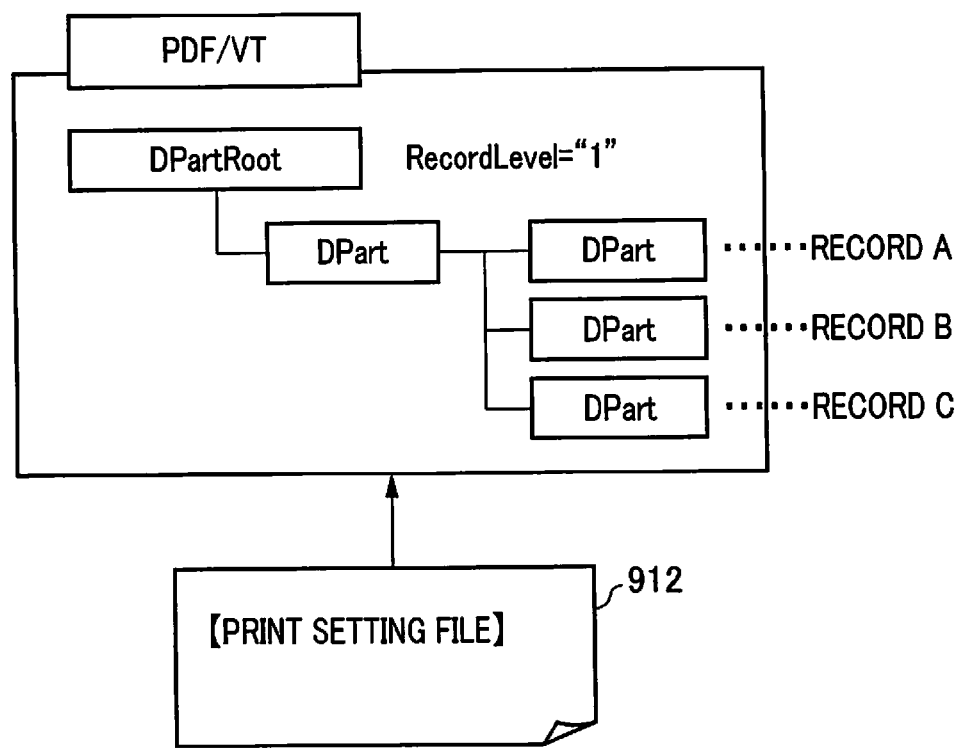
FIG. 6A is a diagram illustrating an exemplary PDF/VT template.

FIG. 6A is a diagram illustrating an exemplary PDF/VT template. DPart in the second layer correspond to a record A, a record B, and a record C, respectively. PDF/VT has only one DPart in the first layer by PDF/VT specification. Also, the parent element of DPart in the first layer is an element called "DPartRoot". Parameters called "RecordLevel" can be set in DPartRoot. The fact that which DPart layer of PDF/VT corresponds to the record layer can be recorded using RecordLevel. The reference number "912" shown in FIG. 6A is a print setting template (print setting file) to be associated with PDF/VT.

Hereinafter, a description will be given of a record layer. A VDP document is created by applying each line (record) of data source to a document template. Hence, a VDP document typically has a structure in which a page group to be created by the application of one record is repeated by the number of lines in data source. The record layer is the DPart layer representing the repetition. The number of DParts in the record layer corresponds to the number of lines (the number of records) in data source.

The reason why, in step S2 shown in FIG. 4, the template creation unit 12 creates PDF/VT templates by the same number as the number of records acquired by DPart in the second layer in step S1 is because the second layer of PDF/VT to be created is to be the record layer. For the value of RecordLevel, the number "0" corresponds to DPart in the first layer, and the value of RecordLevel increases by one each time the level of layer increases by one. In order to set the second layer as the record layer, the template creation unit 12 sets RecordLevel to "1". With this arrangement, DParts in the second layer of the hierarchical structure included in PDF/VT can be set as nodes in the record layer, which correspond to records in a one-to-one relationship.

Figure 5B:
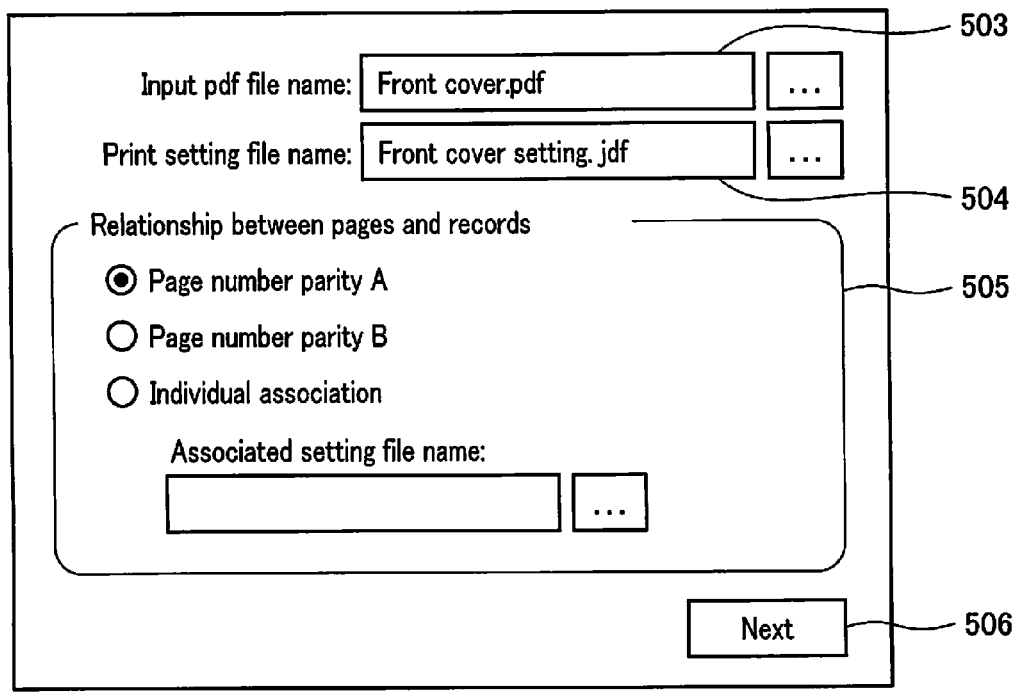
FIG. 5B shows an exemplary PDF file input setting screen.

In step S3 shown in FIG. 4, the input unit 13 inputs a PDF file and a print setting file in accordance with a user's operation made on the PDF file input setting screen shown in FIG. 5B. In this example, the input unit 13 inputs the front cover PDF file and the print setting file for front cover shown in FIG. 3A. Also, the relational information acquisition unit 14 acquires relational information in accordance with a user's operation made on the PDF file input setting screen (step S3). The acquired relational information indicates the relation between pages and records both included in the input PDL file. Hereinafter, a set of a PDF file, a print setting file and relational information is also described as input PDF information.

FIG. 5B shows an exemplary PDF file input setting screen. The PDF file input setting screen is an exemplary user interface displayed by the information processing apparatus 1. A setting field 503 is a field for setting a PDF file to be input by a user. In this example, the file name of a front cover PDF file is set to the setting field 503. A setting field 504 is a field for setting a print setting file to be input by a user. In this example, the file name of a print setting file for front cover is set to the setting field 504. Note that it is optional to set file name to the setting field 504.

The setting field 505 is a field for setting relational information by a user. On the setting field 505, a user selects and sets any one of the settings "page number parity A", "page number parity B", and "individual association" as the relation between pages and records. In this example, a user selects the setting "page number parity A". When a user presses down a "next" button 506, the input unit 13 inputs the PDF file set to the setting field 503 and the print setting file set to the setting field 504. Also, the relational information acquisition unit 14 acquires relational information indicating the relation between pages and records both set to a setting field 505.

A description will be given below of the relation between pages and records both to be selected. Assume that the number of records acquired in step S1 shown in FIG. 4 is "R" and the number of pages included in the PDF file input in step S3 is "P".

The setting "page number parity A" indicates that pages are sequentially associated with records from the leading page of the PDF file by P/R pages per record. For example, when the input PDF file is the chapter 2 PDF file shown in FIG. 3C, the number of records is three and the number of pages is six. Thus, when the setting "page number parity A" has been made, pages are sequentially associated with a record from the leading record by 2 (=6/3) pages per record. Consequently, pages 1 and 2 are associated with the first record, pages 3 and 4 are associated with the second record, and pages 5 and 6 are associated with the third record.

Given that the number of records is "R" and the remainder of A/B is MOD (A, B), the setting "page number parity B" associates the Pth page of the input PDF file with MOD (P, R)th record. When MOD (P, R) is zero, the Pth page is associated with the Rth record. For example, when the input PDF file is the chapter 2 PDF file shown in FIG. 3C, the number of records is three. Thus, when the setting "page number parity B" has been made, each page is associated with MOD (page number, 3)th record. Consequently, pages 1 and 4 are associated with the first record, pages 2 and 5 are associated with the second record, and pages 3 and 6 are associated with the third record.

The setting "individual association" indicates that each page is associated with its corresponding record in allocation setting information. Allocation setting information is information about the correspondence between a page and a record. Allocation setting information is stored in a predetermined storage unit in advance.

Figure 6B:
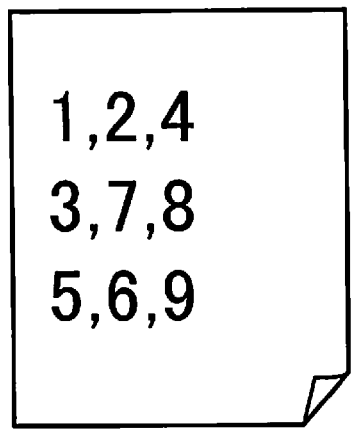
FIG. 6B shows an example of allocation setting information.

FIG. 6B is a diagram illustrating an example of allocation setting information. Allocation setting information shown in FIG. 6B has entries equal to the number of records. In one entry, a page number corresponding to one record is described in a comma separated manner. For example, when the input PDF file is the chapter 1 PDF file shown in FIG. 3B and the setting "individual association" has been made, pages 1, 2, and 4 are associated with the first record in accordance with allocation setting information, pages 3, 7, and 8 are associated with the second record, and pages 5, 6, and 9 are associated with the third record.

Referring back to FIG. 4, the node addition unit 15 adds DParts in the third layer, which are linked with DParts in the second layer included in the template, to the PDF/VT template created in step S2 (step S4). In step S4, the node addition unit 15 further sets attribute information (metadata) about the input PDF file to DPM of each DPart in the third layer.

Figure 7:
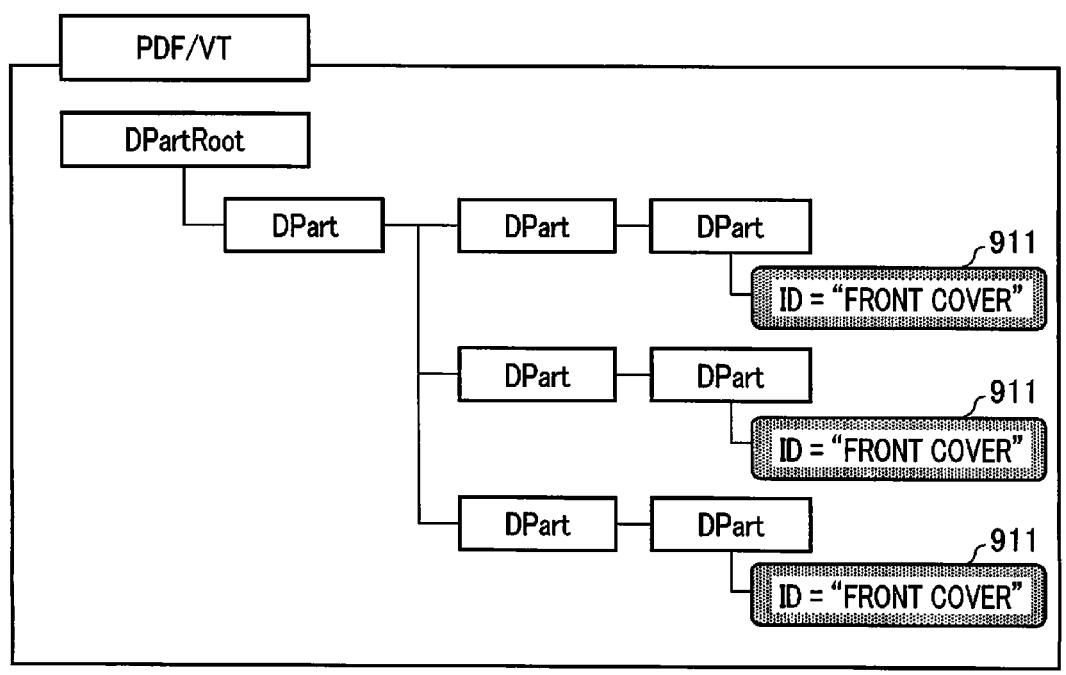
FIG. 7 is a diagram illustrating an example of PDF/VT.

FIG. 7 is a diagram illustrating an example of PDF/VT after the process in step 4 shown in FIG. 4. In this example, in each of DPMs 911 of DParts in the third layer, metadata of which the key is "ID" and the value is "front cover" is set.

Referring back to FIG. 4, the page setting unit 16 maps each page included in the input PDF file to DPart in the third layer based on relational information such that each page becomes the child element of DPart in the third layer (step S5). The page setting unit 16 makes page setting such that the relation between each page and DPart in the third layer is the same as the relation between a page and a record indicated by relational information. The page setting unit 16 further sets the print setting indicated by the print setting file input in step S3 as the print setting for each page correlated to and set at DPart in the third layer to the print setting template (JDF) created in step S2.

Hereinafter, a description will be given of JDF. JDF is a format employed in, for example, POD as a print setting file. As in PDF/VT, JDF also has a hierarchical structure. Among layers included in JDF, a layer called a "set layer" is a layer that corresponds to a unit of repetition of the print setting. The page setting unit 16 associates the set layer of JDF with the record layer of PDF/VT, and further describes the print setting to be applied to each record to the set layer to thereby make print setting for each DPart in the record layer (second layer) of PDF/VT. With this arrangement, the print setting is made for pages mapped to DParts in the third layer, which are linked with DParts in the second layer.

Association of the set layer of JDF with the record layer of PDF/VT is performed by interpreting the value of RecordLevel parameter of DPartRoot by the page setting unit 16. In the present embodiment, the value of RecordLevel of PDF/VT to be output is "1". Thus, the page setting unit 16 associates DPart in the second layer of PDF/VT with the set layer of JDF.

Also, the print setting described in JDF by the page setting unit 16 can be conditionally branched depending on the value of metadata set in PDF/VT. For example, when the value of metadata having a key of "ID" is "front cover", the output paper can be set to "glossy paper", whereas when the value of metadata is "chapter 1", the output paper can be set to "plain paper".

Figure 8:
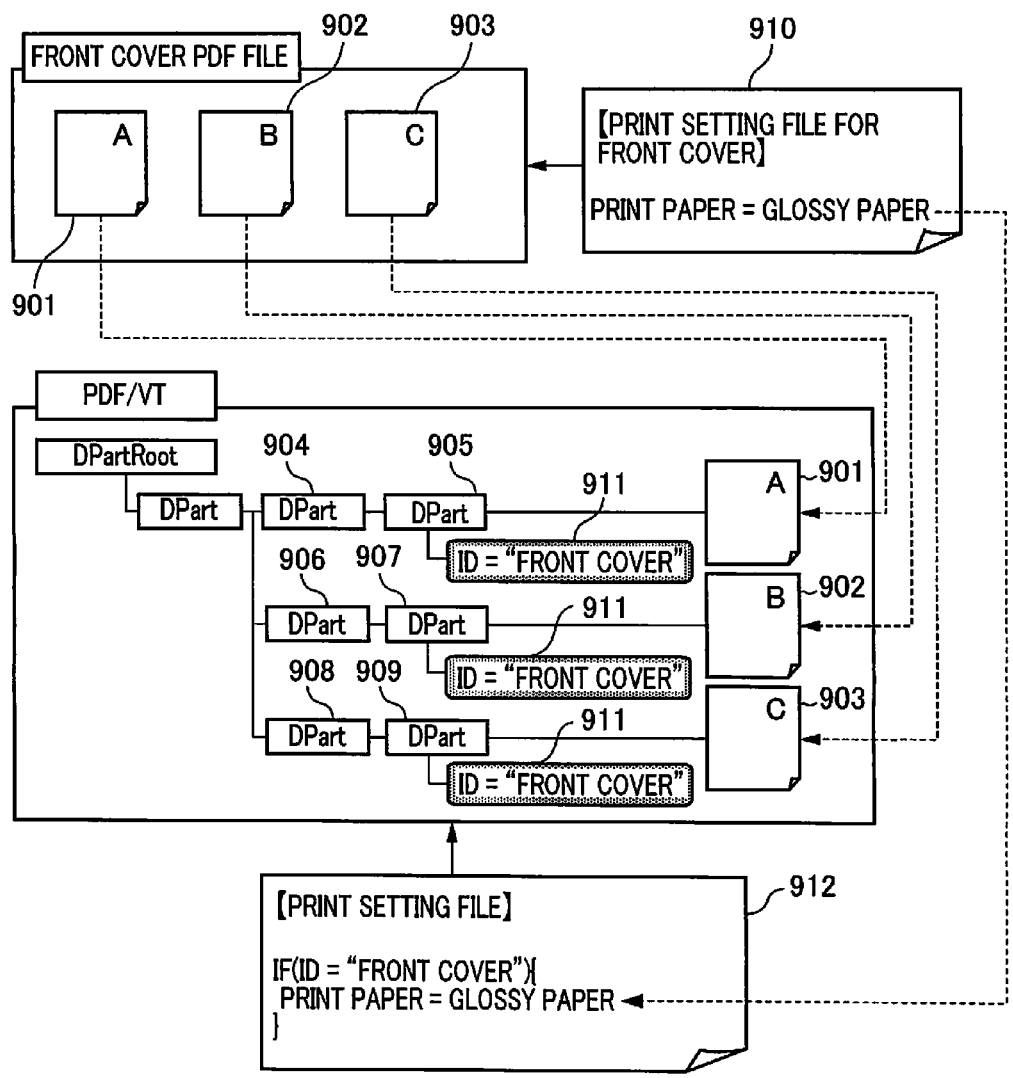
FIG. 8 is a diagram illustrating an example of processing for setting pages included in a PDF file to DParts in a third layer.

FIG. 8 is a diagram illustrating an example of processing for setting pages included in a PDF file to DParts in the third layer. In this example, a description will be given of how pages in the front cover PDF file shown in FIG. 3A are set to the DPart hierarchical structure of PDF/VT in step S5 shown in FIG. 4.

Based on the relational information acquired in step S3 shown in FIG. 4, the page setting unit 16 recognizes that a first page (901) of the front cover PDF file shown in FIG. 3A is the first record, a second page (902) is the second record, and a third page (903) is the third record.

In step S5 shown in FIG. 4, the page setting unit 16 sets the first page (901) to the child element of a DPart (905) which is the child element of a DPart (904) corresponding to the first record of PDF/VT and is linked with the DPart (904). Also, the page setting unit 16 sets the second page (902) to the child element of a DPart (907) which is the child element of a DPart (907) corresponding to the second record of PDF/VT and is linked with the DPart (906). Further, the page setting unit 16 sets the third page (903) to the child element of a DPart (909) which is the child element of a DPart (908) corresponding to the third record of PDF/VT and is linked with the DPart (908).

Here, assume that, in the print setting indicated by the print setting file input in step S3 shown in FIG. 4, the print setting is made such that glossy paper is used for print paper. The page setting unit 16 adds the print setting indicated that glossy paper is used for print paper in pages which are subordinate to DParts having metadata having ID of "front cover" to a print setting file 912.

Referring back to FIG. 4, the output unit 17 queries a user to determine whether or not there is any additional input PDF information (step S6). More specifically, the information processing apparatus displays an additional input data confirmation screen, and the output unit 17 determines whether or not there is additional input PDF information in accordance with a user's operation made on the additional input data confirmation screen.

Figure 5C:
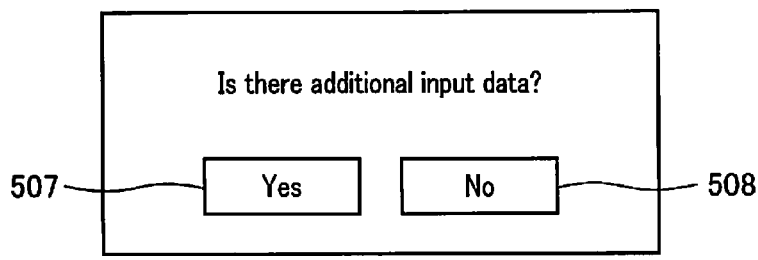
FIG. 5C shows an exemplary additional input data confirmation screen.

FIG. 5C shows an exemplary additional input data confirmation screen. The additional input data confirmation screen is an exemplary user interface displayed by the information processing apparatus 1. When a user presses down a "Yes" button 507 on the additional input data confirmation screen, the output unit 17 determines that there is additional input PDF information.

Then, the process returns to step S3, and the input unit 13 receives additional input PDF information.

When a user presses down a "No" button 508, the output unit 17 determines that there is no additional input PDF information. Then, the output unit 17 outputs the current PDF/VT and print setting file (JDF), and the process is ended.

Figure 9:
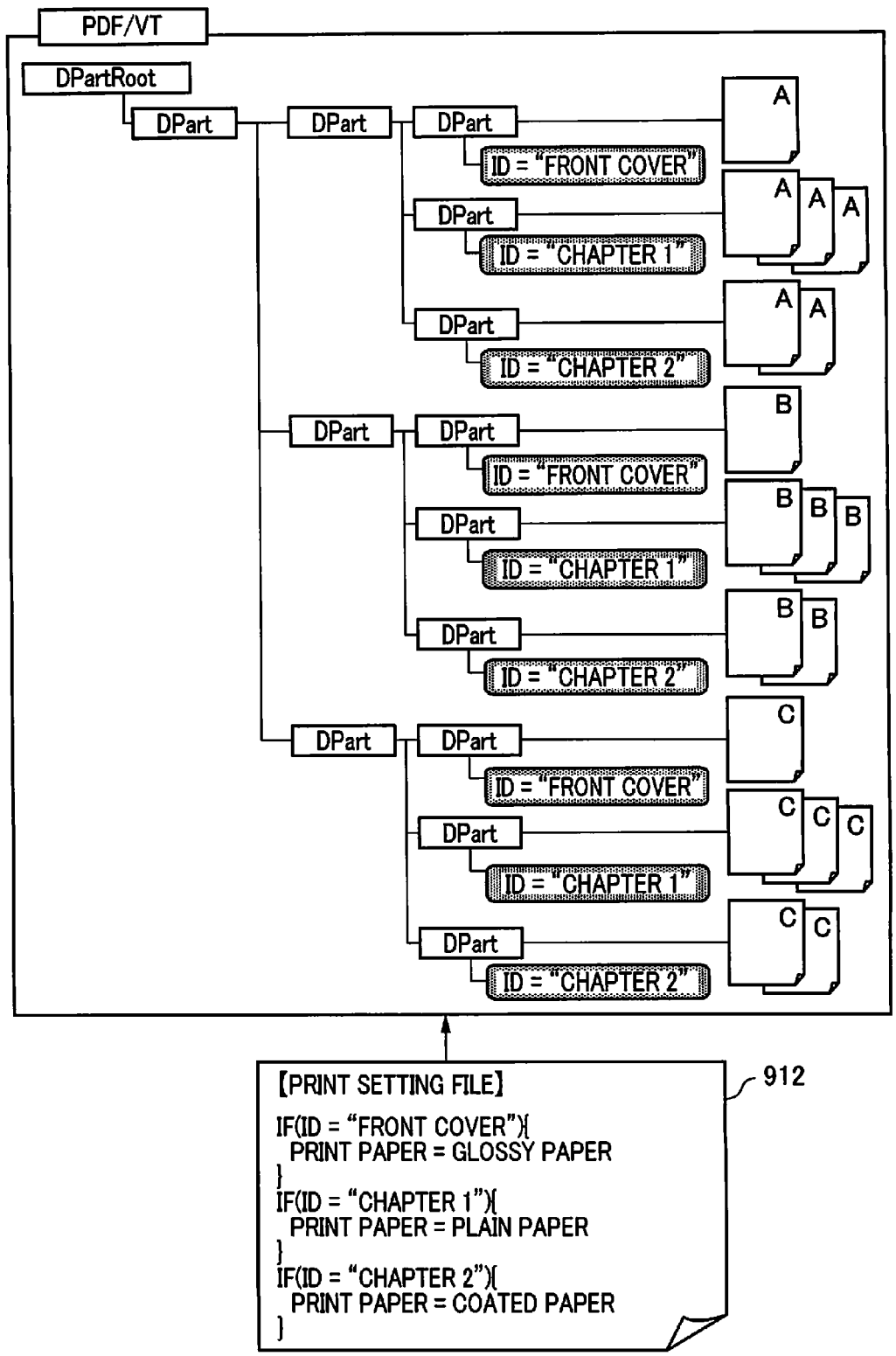
FIG. 9 is a diagram illustrating an example of PDF/VT and its print setting file upon completion of processing for the input PDF file group.

FIG. 9 is a diagram illustrating an example of PDF/VT and its print setting file upon completion of processing for the input PDF file group. When processing for all the input PDF file groups shown in FIGS. 3A to 3C is completed, the output unit 17 outputs PDF/VT and its print setting file shown in FIG. 9.

Here, as a known technique disclosed in Japanese Patent Laid-Open No. 2008-269261, there is a technique that estimates the number of records by analyzing the input PDL data. Thus, the information processing apparatus of the present embodiment may perform the following processing using such a known technique in step S1 shown in FIG. 4. In other words, the record number acquisition unit 11 provided in the information processing apparatus 1 receives a designation of a PDF file which defines the number of records. Then, the record number acquisition unit 11 estimates the number of records using the known technique, and acquires the estimated number of records as the substitute of the number of records input by a user.

When a PDF file to be designated is a PDF file to be converted, the process in step S1 shown in FIG. 4 may be omitted. In this case, the record number acquisition unit 11 estimates the number of records by analyzing the first PDF file input in the first step S3. Also, creation of a PDF/VT template in step S2 is executed in the first step S3.

A user interface displayed by an information processing apparatus is not limited to a user interface for interactive processing for interaction with a user. At the site of commercial printing, it is required that batch processing, which eliminates a user's operation as much as possible, may be performed in the work flow. Thus, an information processing apparatus may display a command-line user interface (Character User Interface: CUI) as shown in FIG. 10.

FIG. 10 is a diagram illustrating an example of CUI for use in conversion processing from a PDF file group into PDF/VT. The CUI shown in FIG. 10 designates the fact that the number of records is "3" and the input PDF files are "front cover.pdf", "chapter 1.pdf", and "chapter 2.pdf". Also, the CUI designates "front cover setting.jdf", "chapter 1 setting.jdf", and "chapter 2 setting.jdf" as the input print setting files. Further, the CUI designates "page number parity A" as the relation between pages and records in PDF. Since the CUI shown in FIG. 10 can receives all the inputs designated by a user at a time, the CUI is effective for batch processing.

Figure 11:
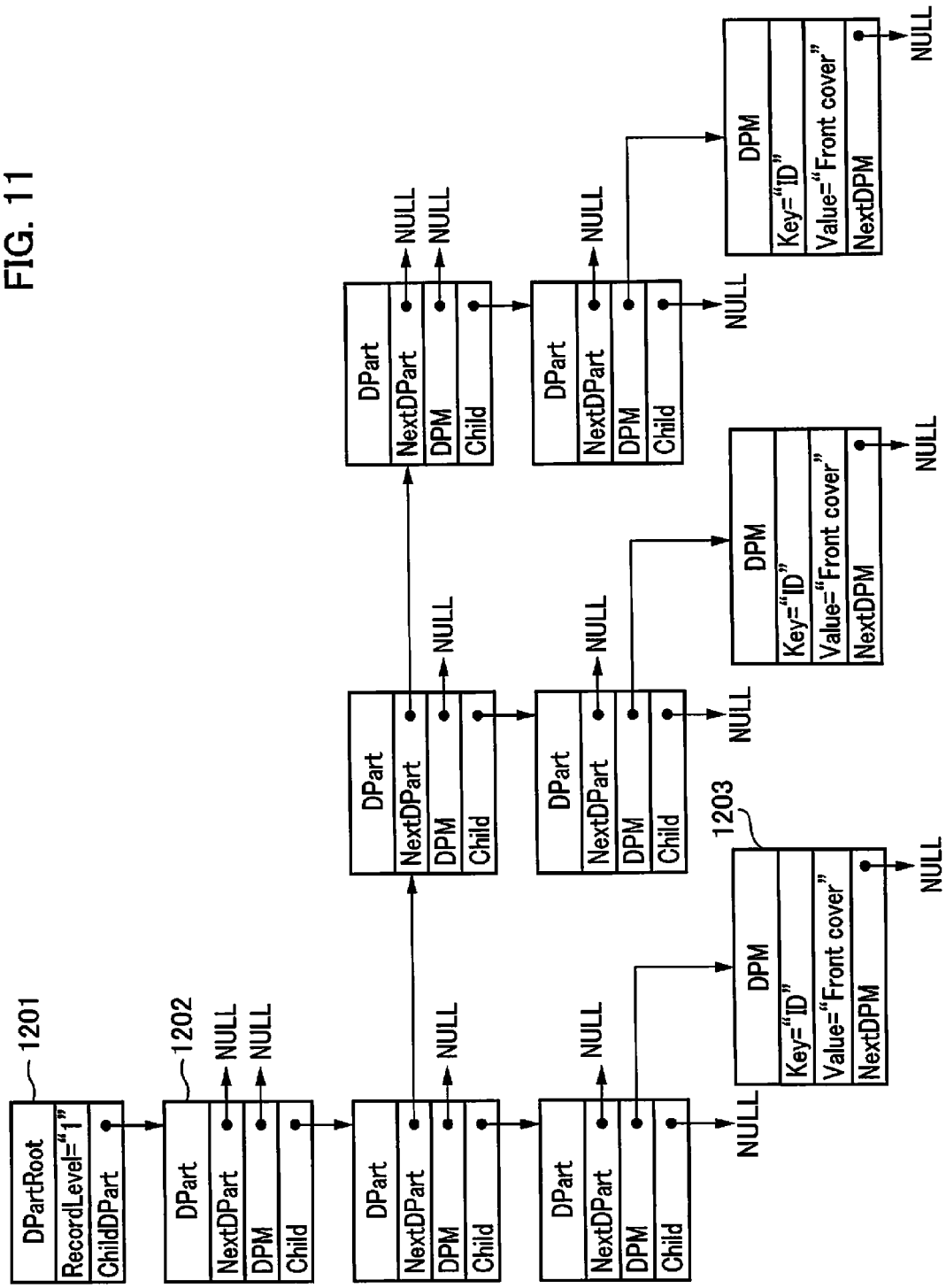
FIG. 11 is a diagram illustrating an example of the data structure for PDF/VT.
Figure 12:
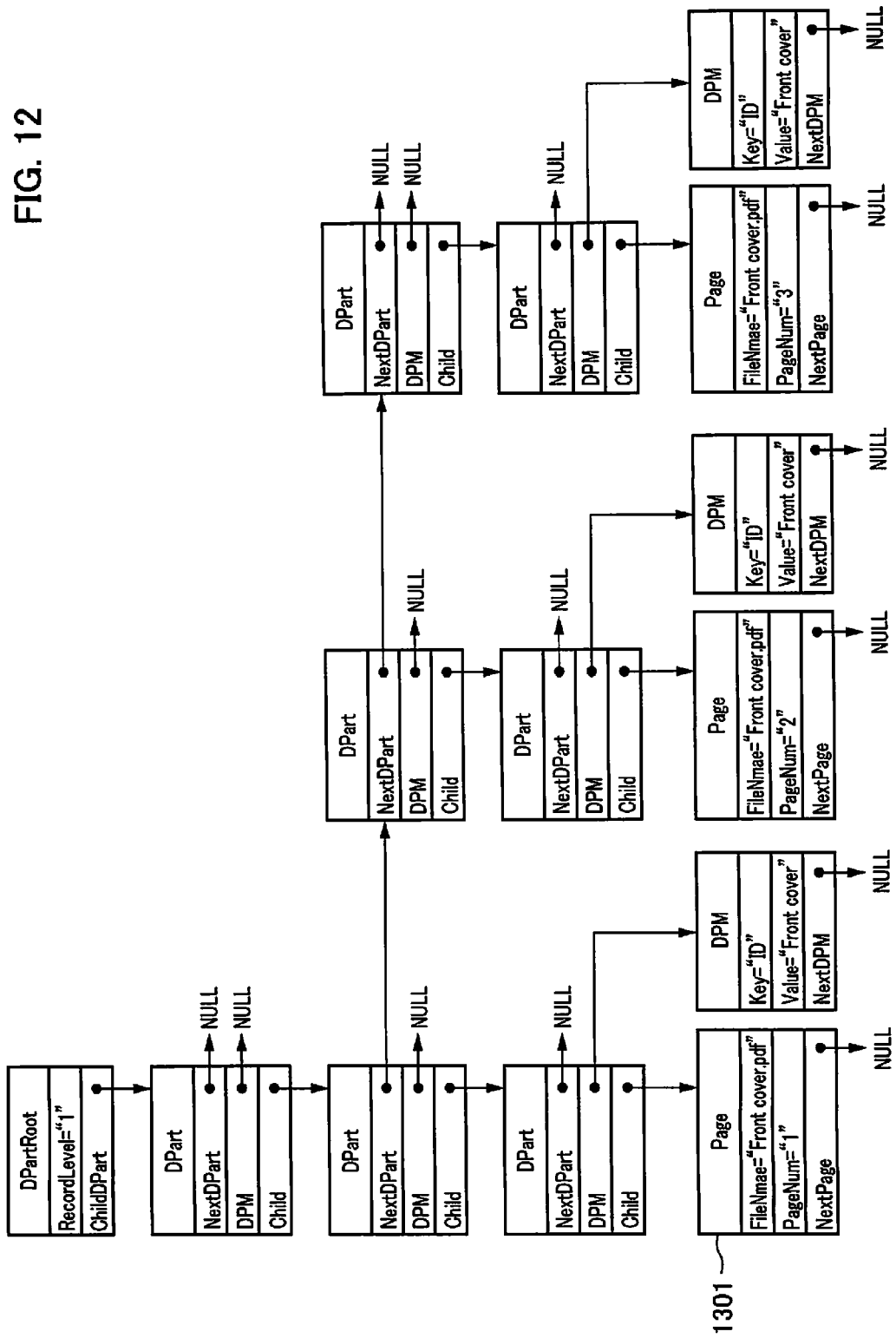
FIG. 12 is a diagram illustrating an example of the data structure for PDF/VT.
Figure 13:
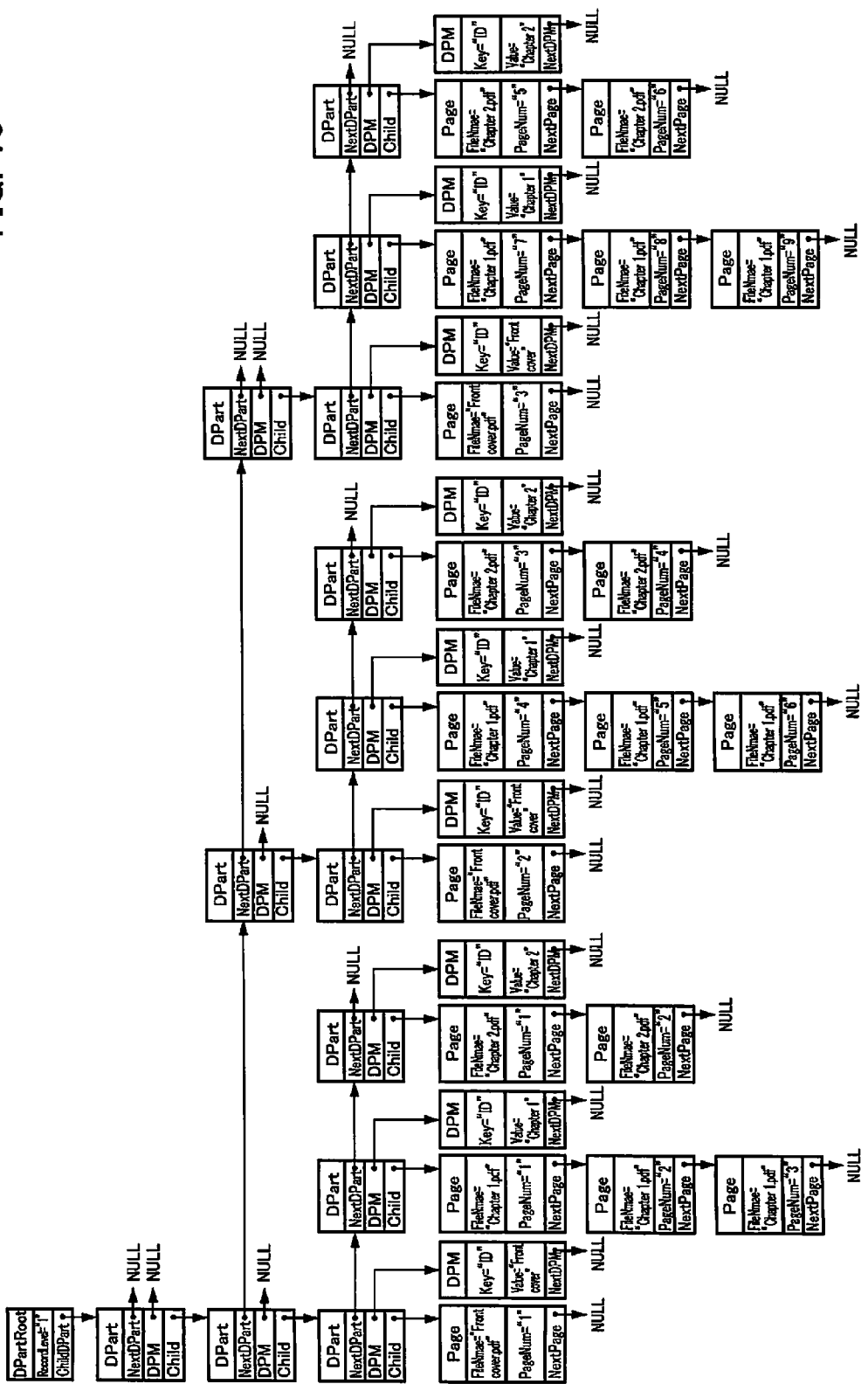
FIG. 13 is a diagram illustrating an example of the data structure for PDF/VT.

FIG. 11 is a diagram illustrating an example of the data structure for PDF/VT shown in FIG. 7. FIG. 12 is a diagram illustrating an example of the data structure for PDF/VT shown in FIG. 8. FIG. 13 is a diagram illustrating an example of the data structure for PDF/VT shown in FIG. 9.

A DPartRoot data structure 1201 shown in FIG. 11 is DPartRoot of PDF/VT. The DPartRoot data structure 1201 holds the value of RecordLevel and the reference to the DPart data structure representing DPart(s) in the first layer. Also, a DPart data structure 1202 indicates one of DParts in PDF/VT. The DPart data structure 1202 holds the reference to the data structure of the next DPart in the same layer, the data structure of DPM, and the data structure of the leading DPart in the next layer. A plurality of DParts in the same layer and the hierarchical structure of DParts are realized by a list structure.

A DPM data structure 1203 indicates one of DPMs in PDF/VT. The DPM data structure 1203 holds the values of "Key" and "Value" in metadata held by DPart which refers to DPM and the reference to another DPM. A plurality of DPMs, each of which can be added to each DPart, is realized by a list structure.

A Page data structure 1301 shown in FIG. 12 indicates one of pages in PDF/VT. The page entity is included in the input PDF file, and thus, the Page data structure 1301 holds the file name and the page number of the input PDF file. Using the combination of these data structures (1201, 1202, 1203, and 1301), the information processing apparatus can create and finally output PDF/VT data shown in FIG. 13.

The information processing apparatus 1 described above converts PDL data into PDL data having a hierarchical structure such that the page structure of the input PDL data can be properly expressed by the hierarchical structure of the converted and output PDL data. For example, if the information processing apparatus 1 uses PDF/VT data which is the conversion of PDF data, flexible print settings which are difficult to be used for PDF data can be made. More specifically, print settings for printing only the leading pages of chapters in a PDF document or print settings for collectively printing a page group which has a semantic unit separated into a plurality of PDF files can be executed. Furthermore, the information processing apparatus 1 can combine print data consisting of a plurality of PDF files into one PDF/VT, which facilitates print data management by a user.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-092684 filed on Apr. 19, 2011, which is hereby incorporated by reference herein in its entirety.

What is claimed is:

1. An information processing apparatus comprising:
a reception unit configured to receive a designation of the number of records of first PDL data including a plurality of records from a user;
a first creation unit configured to create a structure including nodes in a record layer, which correspond to the plurality of records in a one-to-one relationship and are equal in number to the number of the plurality of records, and to add nodes in a lower layer of the record layer, which are linked with the nodes in the record layer, to the structure; and
a second creation unit configured to map each page included in the first PDL data to each node in the lower layer of the record layer based on the relation between the plurality of records and pages included in the first PDL data to thereby create second PDL data which is different from the first PDL data and has a hierarchical structure with respect to the pages.

2. The information processing apparatus according to claim 1, wherein the second creation unit creates the second PDL data by setting attribute information about the first PDL data to metadata of each node in the lower layer of the record layer.

3. The information processing apparatus according to claim 1, wherein, when the number of pages included in the first PDL data is "P" and the number of records is "R", the first creation unit creates the structure by sequentially mapping P/R pages to a node in the lower layer of the record layer from the leading page of the first PDL data by P/R pages per node.

4. The information processing apparatus according to claim 1, wherein, when the number of pages included in the first PDL data is "P" and the number of records is "R", the first creation unit creates the structure by mapping the page of Pth page in the first PDL data to a node in the lower layer of the record layer, which is linked with a node of the record layer and corresponds to a record of MOD (P, R)th record, if MOD (P, R) is not zero or mapping the page of Pth page in the first PDL data to a node in the lower layer of the record layer, which is linked with a node of the record layer and corresponds to a record of Rth record, if MOD (P, R) is zero.

5. The information processing apparatus according to claim 1, wherein the second creation unit creates the second PDL data by receiving input of a print setting file of the first PDL data and mapping a print setting indicated by the print setting file as the print setting for each page set to a node in the lower layer of the record layer.

6. The information processing apparatus according to claim 1, wherein the first PDL data is PDF data, the second PDL data is PDF/VT data, and the nodes in the record layer are DPart.

7. The information processing apparatus according to claim 6, wherein the second creation unit sets DPart in a second layer of the hierarchical structure as the nodes in the record layer, which correspond to the plurality of records in a one-to-one relationship, by setting the value of RecordLevel of DPartRoot in the PDF/VT to "1".

8. A PDL data conversion method comprising:
receiving, in a reception step, a designation of the number of records of first PDL data including a plurality of records from a user;
creating, in a first creation step, a structure including nodes in a record layer, which correspond to the plurality of records in a one-to-one relationship and are equal in number to the number of the plurality of records, and adding nodes in a lower layer of the record layer, which are linked with the nodes in the record layer, to the structure; and
mapping, in a second creation steps each page included in the first PDL data to each node in the lower layer of the record layer based on the relation between the plurality of records and the pages included in the first PDL data to thereby create second PDL data which is different from the first PDL data and has a hierarchical structure with respect to the pages.

9. The PDL data conversion method according to claim 8, wherein, in the second creation step, the second PDL data is created by setting attribute information about the first PDL data to metadata of each node in the lower layer of the record layer.

10. The PDL data conversion method according to claim 8, wherein, in the first creation step, when the number of pages included in the first PDL data is "P" and the number of records is "R", the structure is created by sequentially mapping P/R pages to a node in the lower layer of the record layer from the leading page of the first PDL data by P/R pages per node.

11. The PDL data conversion method according to claim 8, wherein, in the first creation step, when the number of pages included in the first PDL data is "P" and the number of records is "R", the structure is created by mapping the page of Pth page in the first PDL data to a node in the lower layer of the record layer, which is linked with a node of the record layer and corresponds to a record of MOD (P, R)th record, if MOD (P, R) is not zero or the structure is created by mapping the page of Pth page in the first PDL data to a node in the lower layer of the record layer, which is linked with a node of the record layer and corresponds to a record of Rth record, if MOD (P, R) is zero.

12. The PDL data conversion method according to claim 8, wherein, in the second creation step, the second PDL data is created by receiving input of a print setting file of the first PDL data and mapping a print setting indicated by the print setting file as the print setting for each page set to a node in the lower layer of the record layer.

13. The PDL data conversion method according to claim 8, wherein the first PDL data is PDF data, the second PDL data is PDF/VT data, and the nodes in the record layer are DPart.

14. The PDL data conversion method according to claim 13, wherein, in the second creation step, DPart in a second layer of the hierarchical structure is set as nodes in the record layer, which correspond to the plurality of records in a one-to-one relationship, by setting the value of RecordLevel of DPartRoot in the PDF/VT to "1".

15. A non-transitory computer readable storage medium on which is stored a computer program for making a computer execute a PDL data conversion method, the method comprising:
receiving a designation of the number of records of first PDL data configured of a plurality of records from a user;
creating a structure including nodes in a record layer, which correspond to the plurality of records in a one-to-one relationship and are equal in number to the number of the plurality of records;
adding nodes in a lower layer of the record layer, which are linked with the nodes in the record layer, to the structure; and
mapping each page included in the first PDL data to each node in the lower layer of the record layer based on the relation between the plurality of records and pages included in the first PDL data to thereby create second PDL data which is different from the first PDL data and has a hierarchical structure with respect to the pages.

* * * * *